UNITED STATES PATENT OFFICE.

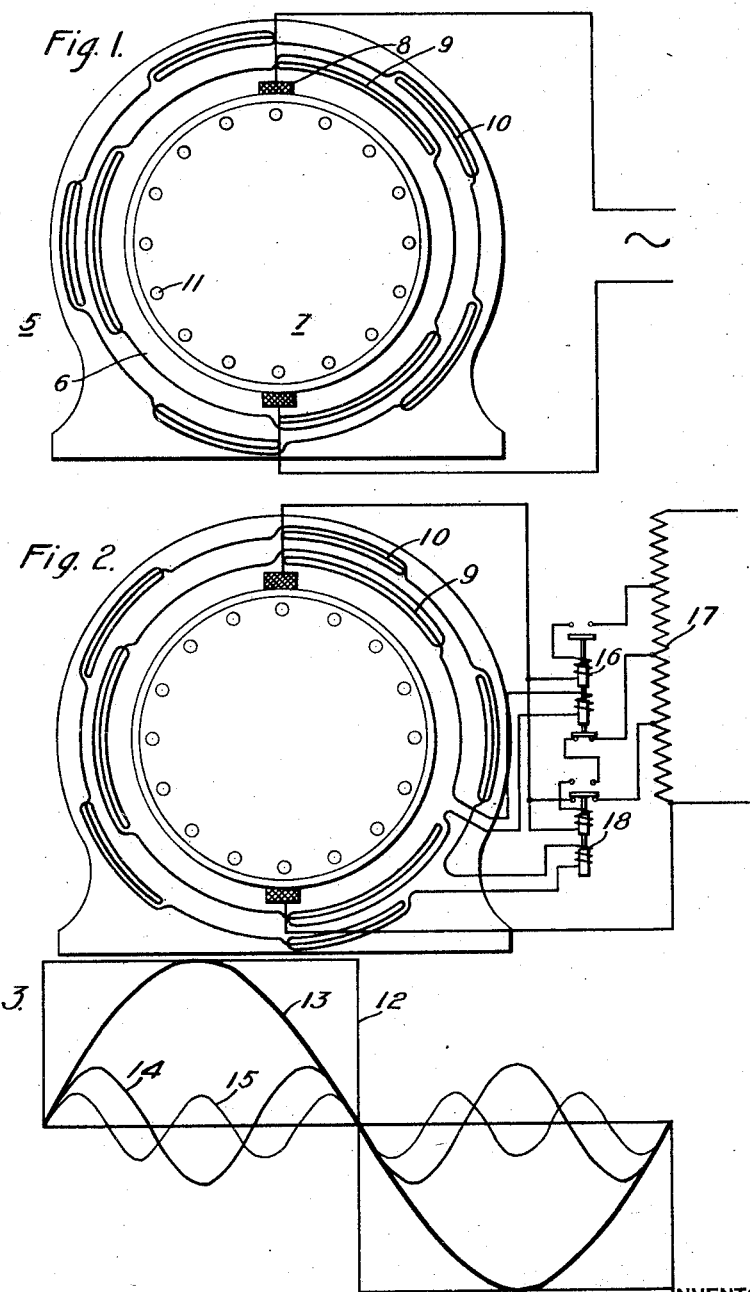

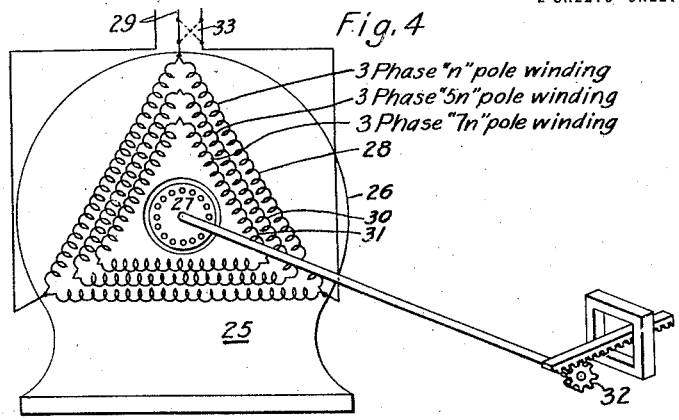
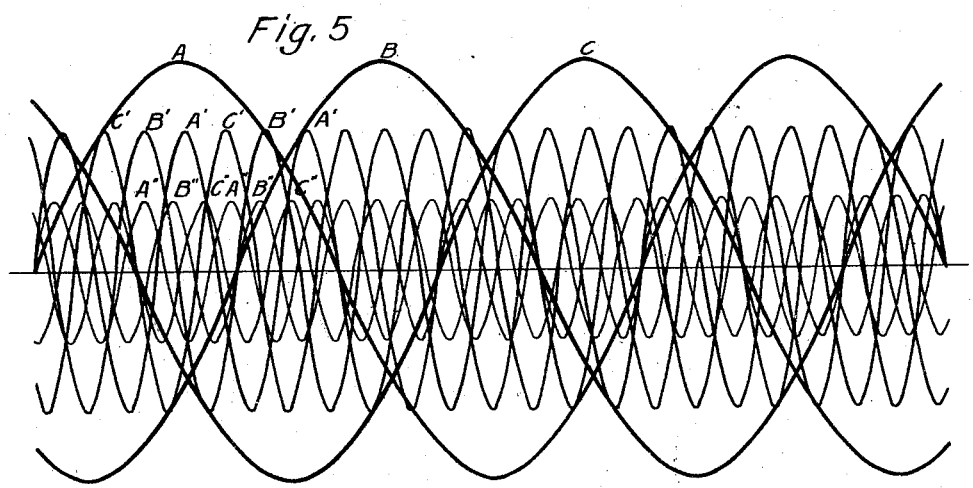
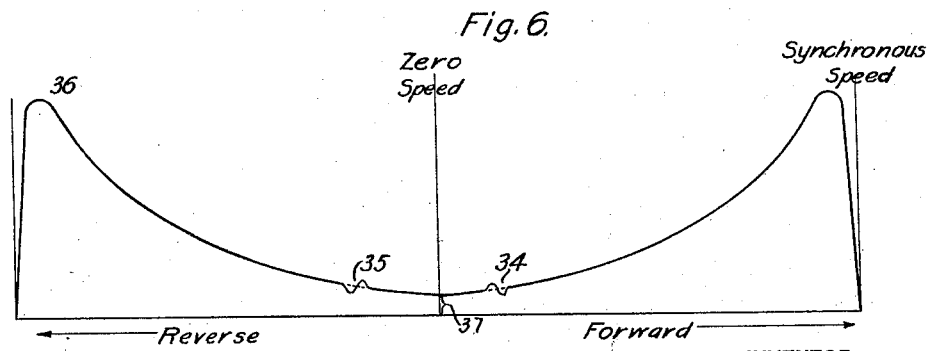

LEWIS WARRINGTON CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SINGLE-PHASE DYNAMO-ELECTRIC MACHINE OF THE INDUCTION TYPE.

1,427,360.      Specification of Letters Patent.   Patented Aug. 29, 1922.

Application filed January 16, 1919.  Serial No. 271,447.

*To all whom it may concern:*

Be it known that I, LEWIS WARRINGTON CHUBB, a citizen of the United States, and a resident of Edgewood Park, in the county of Allegheny and State of Pennsylvania, have invented a new and useful Improvement in Single-Phase Dynamo-Electric Machines of the Induction Type, of which the following is a specification.

My invention relates to dynamo-electric machines of the induction type, and it has for its object to provide means whereby the disastrous disturbing effects of the upper harmonic components of the primary field form may be obviated and whereby the device may be accelerated and controlled in a simple and effective manner.

Fig. 1 of the accompanying drawings is a diagrammatic view of a single-phase induction motor embodying one form of my invention; Fig. 2 is a view similar to Fig. 1; Fig. 3 is a wave diagram illustrating the primary field form in the ordinary single-phase induction motor with concentrated field winding, together with certain of the components thereof; Fig. 4 is a diagrammatic showing of a polyphase induction motor embodying a preferred form of my invention; Fig. 5 is a wave diagram illustrating the action within the motor of Fig. 4; and Fig. 6 is a speed-torque diagram illustrating a difficultly encountered in the control of polyphase motors which may be obviated by the use of my invention.

It is well known that the single-phase induction motor has a single-phase or oscillating primary magnetic field and if the primary winding is concentrated, the field form is substantially a square-top wave.

As is further well known, any single-phase or oscillating function may be resolved into two oppositely rotating functions having a maximum amplitude substantially one-half that of the oscillating function.

It is still further well known that any symmetrical periodic function may be resolved by Fourier's series into the sum of a plurality of sine waves having the fundamental frequency and multiple harmonics thereof. Thus, with a single-phase induction motor, the square-top field form may be considered as resolved into a fundamental and trains of harmonics, each of which rises and falls with the primary field flux. The fundamental may be resolved into two oppositely rotating fields, each rotating at synchronous speed, and each of the harmonic fields may be resolved into oppositely rotating fields, rotating at $\frac{1}{n\text{th}}$ of synchronous speed, where $n$ is the number of the harmonic in question. Thus, in the ordinary motor, there are oppositely rotating fields moving at synchronous speed, oppositely rotating fields moving at one-third synchronous speed, oppositely rotating fields moving at one fifth synchronous speed, etc. At or about synchronous speed, all but one of these fields cut the secondary conductors at a relatively high rate and they are, therefore, damped out by the inductive currents in the secondary winding. The only field not affected in this way is the forwardly rotating fundamental synchronous field which furnishes the main magnetizing action when running at full speed.

Similarly, when running at substantially one-third synchronous speed, the forwardly rotating component of the third harmonic, with a six-pole field, has merely what may be termed a slight slip with respect to the secondary conductors and, therefore, tends to produce marked secondary currents and to hold the rotor at this speed, forming a dead point or cusp of deficient torque in the torque curve.

By providing a six-pole winding on the primary member in a two-pole machine, an inductive response may be developed to this particular third harmonic field and, by short-circuiting this winding, the field may be damped out. Similarly, a ten-pole winding tends to damp out the effect of the forwardly rotating components of the fifth harmonic.

Not only may these auxiliary primary windings be short-circuited but they may also be connected in circuit with electro-responsive devices for the control of motor acceleration, etc.

Similarly, in polyphase induction motors, the effect of upper harmonics of the supply current is to provide cusps of deficient torque which may be removed in a similar manner.

Thus, in the three-phase motor, the effect of the 9th and 27th harmonics is to produce a fixed field, the effect of the 5th and 11th harmonics is to produce a backwardly rotating field and the effect of the 7th, 13th, etc., harmonics is to produce a forwardly rotating field. In a machine subject only to forward rotation, therefore, it is necessary to provide damping means, preferably of polyphase form, only for the 7th, 13th, etc., harmonics but, for a machine continuously subject to reversal, as for driving a planer, it is desirable to provide for the 5th, 11th, etc., harmonics, in addition.

Referring to the drawing for a more detailed understanding of my invention, I show an induction motor at 5 in Fig. 1 comprising a stator member 6 and a rotor member 7, the stator member 6 being provided with a concentrated main primary winding 8 of bipolar form, with an auxiliary primary winding 9 having six poles, and with an auxiliary primary winding 10 having ten poles.

The rotor member 7 is provided with a secondary member 11 of squirrel-cage form.

In operation, the primary winding 8 produces a square-top field form, as shown at 12 in Fig. 3, and this may be resolved into a sine fundamental 13, a third harmonic 14, a fifth harmonic 15 and still higher harmonics (not shown). The windings 9 and 10 are closed upon themselves and tend to damp out the harmonics 14 and 15, as before explained with elimination of cusps of deficient torque.

In the system of Fig. 2, the elements of the motor are the same as in Fig. 1 but the winding 10 is connected to energize a relay 18 and the winding 9 is connected to energize a relay 16, these relays operating to raise the voltage applied to the motor from an auto-transformer 17 in a well-known manner, the relay 18 raising the applied voltage when one fifth speed is reached and the relay 16 performing a similar function at one-third speed. Suitable interlocking and holding circuits are shown with the relays 18 and 16 to permit this operation.

To this point, I have discussed the single-phase motor having a concentrated winding, as this is the simplest case, but similar harmful torque cusps tend to appear with all forms of distributed primary windings, as it is substantially impossible to secure a pure sine-wave distribution in the field, and these difficulties may be eliminated in a similar manner.

In Fig. 4 is shown a polyphase motor at 25 comprising a stator primary member 26 and a secondary rotor member 27, the latter, preferably, of the squirrel-cage type. The stator 26 is provided with a three-phase winding 28 having $n$ poles and connected to be energized from suitable supply mains 29.

The stator 26 is further provided with a closed-circuit damping winding 30 of three-phase character and having $5n$ poles and, similarly, with a three-phase damping winding 31 having $7n$ poles.

The rotor 27 is mechanically coupled to drive a load, indicated as a planer at 32, and the direction of rotation may be reversed, as by interchanging two supply leads at 33.

Referring to Fig. 5, the three-phase fundamental supply waves are shown at A, B and C, the corresponding 5th harmonic waves at A', B' and C' and the corresponding 7th harmonic waves at A'', B'' and C''. It will be noted that, with the phase sequence of the fundamental toward the right, the phase-sequence of the 5th harmonic is toward the left and the phase-sequence of the 7th harmonic is toward the right. In other words, the effect of a 5th harmonic in the supply current of a polyphase motor is to produce a backwardly rotating field having one-fifth the speed of the fundamental field, and the effect of the 7th harmonic is to produce a forwardly rotating field having one-seventh the speed of the fundamental field, these fields providing cusps of deficient torque, as indicated in the speed-torque curve of Fig. 6, the cusp at 34 being at one-seventh speed forward and that at 35 being at one-fifth speed reverse.

In the operation of the planer 32, the motor is reversed when operating at full speed and thus, temporarily operates at substantially 100% negative slip or at the point 36 in Fig. 6. It is rapidly brought to rest and accelerated in the reverse direction but has hitherto tended to stop, either at the point 35 or at the point 34, because of the deficient torque at these cusp points. The effect of the polyphase damping windings 30 and 31 is to damp out these undesired fields, thus maintaining the torque of the motor at its desired value.

Another valuable feature of this invention resides in the fact that motors are frequently sold with a guaranteed starting torque of the value indicated at 37 in Fig. 6. In operation they may fail to meet this guarantee because of the cusp at 34 and, by the use of my invention, this difficulty is avoided.

While I have shown my invention in two forms, it will be obvious to those skilled in the art that it is susceptible of various minor changes and modifications without departing from the spirit thereof and I desire, therefore, that only such limitations shall be placed thereupon as are imposed by the prior art or are specifically set forth in the appended claims.

I claim as my invention:

1. In an alternating-current dynamo-electric machine of the induction type, the combination with a main primary winding and a secondary winding, of an auxiliary closed primary winding having "$n$" times the poles of said main winding, "*n*" being an odd integer, and electro-responsive means in circuit with said auxilary primary winding for controlling the operation of said machine.

2. The method of accelerating an induction motor which comprises actuating the accelerating switching apparatus in accordance with the development of the forwardly rotating components of the harmonic components of the fundamental primary field.

3. The combination with a dynamo-electric machine having a relatively stationary member and a relatively movable member, of means on one of said members tending to produce a magnetic flux having a harmonic component in its field form, a winding on said member having a greater number of poles than the fundamental component of said flux, the relative number of poles corresponding to the order of said harmonic component, and a current-responsive device in circuit with said winding for controlling the operation of said machine.

4. The combination with an alternating-current machine having a relatively stationary member and a relatively movable member, a primary winding on said relatively stationary member having a harmonic component in its field flux form, a closed-circuited secondary winding on said relatively movable member, means forming an auxiliary winding on one of said members having a greater number of poles than said primary winding, the relative number of poles corresponding to the order of said harmonic component, and a current-responsive device in circuit with said auxiliary winding for controlling the operation of said machine.

5. The combination with a dynamo-electric machine having a relatively stationary member and a relatively movable member, of means tending to produce a harmonic component current in one of said members, a winding on said member having a greater number of poles than the fundamental component of said flux, the relative number of poles corresponding to the order of said harmonic component, and a current-responsive device in circuit with said winding for controlling the operation of said machine.

6. The combination with a dynamo-electric machine having a relatively stationary member and a relatively movable member, of means tending to produce a harmonic component current in one of said members, a winding on said member having a greater number of poles than the fundamental component of said flux, the relative number of poles corresponding to the order of said harmonic component, and a current-responsive device in circuit with said winding for controlling the operation of said machine and providing a low-impedance short-circuited winding of said greater number of poles.

In testimony whereof, I have hereunto subscribed my name this 30th day of Dec. 1918.

LEWIS WARRINGTON CHUBB.